United States Patent [19]

Anselrode

[11] 4,366,542

[45] Dec. 28, 1982

[54] CONTROLLING THE OPERATION OF A PRINTING EQUIPMENT

[75] Inventor: Lodewi k Anselrode, St. Anthonis, Netherlands

[73] Assignee: Stork Brabant B.V., An Boxmeer, Netherlands

[21] Appl. No.: 175,774

[22] Filed: Aug. 6, 1980

[30] Foreign Application Priority Data

Aug. 10, 1979 [NL] Netherlands ......................... 7906131

[51] Int. Cl.[3] ......................... G06F 15/46; B41F 31/04

[52] U.S. Cl. .................................... 364/469; 101/116; 101/181; 364/148; 364/183

[58] Field of Search ............... 364/468, 469, 470, 471, 364/519, 118, 105, 183, 148; 101/115, 116, 181, 248, 365

[56] References Cited

U.S. PATENT DOCUMENTS 3,702,587 11/1972 Lee ................................ 101/365 X
3,774,536 11/1973 Raymond et al. .............. 101/365 X
3,963,902 6/1976 Dowd ............................ 101/181 X
4,264,957 4/1981 Pautzke .............................. 364/469

*Primary Examiner*—Joseph F. Ruggiero

*Attorney, Agent, or Firm*—Silverman, Cass & Singer, Ltd.

[57] ABSTRACT

Method and apparatus for establishing and maintaining control of the operation of a printing equipment such as for example the type of equipment which is used for printing fabric webs. The equipment includes a series of printing elements such as rotary screens each of which is required to apply a single color to the moving web and all of the colors required to be in registration. The type of equipment with which the invention is especially concerned has a plurality of printing elements and most often these comprise more than the number used in printing on paper and the like webs although the invention is applicable thereto. The invention is concerned with the operating parameters for the equipment and for the several printing elements, these being recorded on a suitable carrier for a given printing project and used for adjustment of the elements and related components of the printing equipment for repetitions of the same project, the information being recorded digitally. Various automatic adjustments provide substantial economy in setting up and operating the printing equipment.

18 Claims, 5 Drawing Figures

CONTROLLING THE OPERATION OF A PRINTING EQUIPMENT

FIELD AND BACKGROUND OF THE INVENTION

This invention is in the field of printing equipment and is concerned with a method and apparatus for controlling the operation of such printing equipment wherein the said equipment includes a plurality of printing elements all operating on a moving web to apply respective images to the web in different colors, for example. Each printing element has a set of operating parameters each of which must be adjusted and controlled, and the sets of parameters have some relationship with one another to the end that the final result upon the web will represent a properly registered pattern.

The method and apparatus of the invention are directed to a concept in which the parameters are recorded on an information carrier and identified with a particular project or pattern so that when it is desired to repeat that project or pattern the carrier is used to achieve the desired setting up of the printing equipment. Thus time and materials are saved. Furthermore, the information on the carrier is not static but can be varied by the measurement and comparison of the same with parameter readings taken as the apparatus is being used continuously to maintain the best information.

Although the measures according to the invention may be used in any known printing equipment or apparatus, particular advantages are obtained when using the measures provided by the invention in a rotary screen printing machine having a system wherein a plurality of cylindrical screens is supported and means are provided for setting the position of the screens: in the direction of travel of the material (longitudinal relationship); in transverse direction (transverse relationship), and in diagonal direction (inclined adjustment), as well as for effecting the angular adjustment of the squeegee for each screen, adjustment of the pressure applied by the squeegee and of the location of the squeegee in the direction of travel of the print-receiving material, means for setting the paint level in the respective screens, and means for adjusting the glue and water film thickness on the printing blanket.

This type of printing apparatus with adjusting mechanisms, belonging to the state of the art, is described in Dutch patent application No. 7,511,692. Adjusting means for the individual screens and the associated squeegee are described in Dutch patent application No. 6,910,511 and are not further explained herein. These mechanisms and means afford the accurate adjustment of the position of the respective screen in the longitudinal and transverse directions as well as in a direction diagonal with respect to the moving band and the web material supported thereon.

Each screen is furthermore provided with means, likewise belonging to the state of the art, for axially tensioning the screen, there being disposed in each screen a squeegee with a mechanism for adjusting the position of the squeegee, likewise belonging to the state of the art and described in Dutch patent application No. 7,103,481.

Such a printing apparatus will obviously be used in conjunction with auxiliary equipment for the feeding of the web material to be printed, an arrangement for carrying out the steam treatment of the printed web material for the purpose of fixing the colorants, and control and regulating equipment.

As said, a printing apparatus such as described hereinbefore is provided with many adjusting mechanisms for effecting the following adjustments:

position of the screens in:

(a) the direction of travel of the material (longitudinal relationship)

(b) the transverse direction (transverse relationship), and (c) the diagonal direction (inclined position), and for each screen: the angular setting of the squeegee, the pressure at which the squeegee rests upon the inner surface of the screen and the paint level in the respective screens. Such adjusting mechanisms are, as said, part of the state of the art.

In the case of the known printing apparatuses, these adjusting mechanisms consist of manually operated means, for example handwheels which are coupled to the various adjusting devices by way of knurled wheels, transmission belts or flexible shafts. The form of embodiment to be described according to the subject application utilizes, for the adjusting mechanisms, servomotors which are known per se and not further explained herein, and which may be controlled either by manually operated switching devices, such as push buttons, or by suitable electric circuits, and whose shaft extending therefrom can be driven rotatably, clockwise or counterclockwise, under the influence of an appropriate control command; each servomotor is coupled to a sensor which indicates the instantaneous position of the shaft and thus the parameter value. Such apparatuses are known as such in many different forms (optical, mechanical, inductive) and so will be described hereinafter in a general manner only.

The parameters which are adjusted by means of the apparatus described hereinbefore are as follows:

(1) Position of the screens with respect to one another as measured in the direction of travel of the print-receiving material (i.e. longitudinal relationship).

(2) Adjustment of the screens in a direction parallel to their axis of rotation (i.e. transverse adjustment).

(3) Adjustment of the tangent between the screen and the print-receiving material in order to obtain a proportioning in the event of inaccuracies if any in the patterning (i.e. inclined adjustment).

(4) Adjustment of the angle of the squeegee blade, which affects the quantity of printing ink (paint) applied during the printing process.

(5) The pressure of the squeegee. In textile printing, the mechanical force of pressure applied determines to a large extent the penetration of the printing paint into the material.

(6) The location of the squeegee as measured in the direction of travel of the print-receiving material. In addition to influencing the quantity of printing paint applied, this setting is also a determining factor for the mechanical pressure of the screen.

(7) The level of the printing paint in the screen. At a constant viscosity, the paint level has some influence on the paint yield as a result of the hydrostatic pressure.

(8) Thickness of the glue layer on the printing band.

In general, there is provided in a rotary screen printing machine for the printing of fabric-like materials whose dimensions are not very stable, a conveyor band supporting and moving the material to be printed. To ensure tight positioning and prevent displacement, a temporary glue film is frequently applied to said band by means of a glue applicator, a washing device removing, at each revolution of the band, the glue film to the extent this may still be present, the glue film to be subsequently applied again. The thickness of the glue film is of importance to the quality of the material printed. Displacement may occur if the film of glue is too thin, whereas, if the glue film is too thick, there will not only occur an unnecessary waste of glue but it may adversely affect the penetration of the printing paint brought upon the material to be printed.

(9) Thickness of the water film after the band-washing device.

Even if there should be no temporary glue layer to be washed off, it may still be necessary to remove, with each revolution of the band, the printing paint which during the printing of the fabric penetrates down to reach the conveyor band. It is important to control the water film originating from the washing device and left on the band. This water film may affect the glue layer to be applied as well as the penetration of the printing paint to be applied during the printing process.

It is known to control a printing apparatus having a series of print elements, such as screens, which as to the operating parameters are individually adjustable, the parameter values as determined for the first print job format being recorded on an information carrier, and said information being read out for a repeated print run of the same pattern to be carried out and being used to adjust the various parameters. The method is disclosed in Dutch patent application No. 7,511,692. The object of this known method is to speed up and simplify the manual operations needed for the initial setup of a printing apparatus prior to performing a printing job wherein a certain pattern is printed on a web of moving material by means of a number of print elements. To this end, particulars pertinent to the respective operating parameters to be set are recorded on a record card pertaining to the particular pattern, said particulars being used to set the operating parameters of the various print elements prior to performing a repeated print job.

The first printing of a new pattern requires that all the various parameters of the successive screens be set in a manner so that the end product is of optimum quality. It has been known that in most cases such adjustments will differ from the respective initial reference adjustments. In the case of the known printing apparatuses the procedure is such that, when optimum results have been attained with the first print job, the adjustments of the various parameters are noted and recorded on the information card; when after a certain time the same pattern is to be printed again on a certain amount of material, this card, which has been preserved and which bears also the pattern designation, is used to adjust, before actually starting the running of the printing apparatus, the parameters in accordance with the values recorded on the card.

Although this method provides an improvement on traditional methods, it is by far not the best method, and maximum accuracy and speed of adjustment are certainly not attained. In order to obtain the best possible settings it is necessary to effect a number of operations manually while visually observing the printing results obtained and having already started the printing process. In addition, it is necessary to preserve the record card for each composition of colors used for each particular pattern and, when repeating the pattern, to place it in the proper position and view it, while it is necessary to use mechanical adjusting means so as to approximate the optimum settings desired.

The invention not only further simplifies the procedure of adjustment by using a special method for recording the various parameter values which at any moment desired can be read out again and be used to control the various settings but also by effectively taking advantage of the possibilities offered by modern digital techniques for controlling the printing apparatus. According to the invention, the process takes place in a manner so that the various parameter values are converted into a digital form and this information together with information characterizing the respective pattern is recorded on a suitable carrier, these data being read out at the beginning of a print run to be repeated of said pattern and used to carry out the various parameter adjustments.

It is evident that in this manner quite substantial savings both in time and in material are obtained, since all information relative to a certain pattern and the corresponding adjustments of the print elements can be recalled in a very short time and the adjustment of the various parameters can be effected at practically the same moment.

Due to some slight play in mechanical transmissions, dimensional differences caused by tolerances, elongation and other mechanical changes, it may happen in practice that after a number of print runs the optimum settings then valid differ from the optimum settings originally found. According to the invention, this is taken into account in that, during a repeated print run, new parameter values being used and deviating from the original parameter values are brought onto the information carrier to replace the original values.

The known method proceeds in a manner so that, when for the first time determining the parameter settings for a new pattern based on the reference positions of the print elements while simultaneously evaluating the printing results obtained, the optimum settings are approximated. Obviously, such procedure leads to a large waste of material in that, also because of the large number of adjustments to be effected, the ultimate optimum adjustment is only slowly approached. According to the invention, this optimum adjustment can be found much faster in that, during the operation of the printing apparatus, for each print element the individual differences of the printing parameters with respect to the reference parameter values as determined by the construction of the apparatus are observed and the average of these differences is determined and recorded, and, when carrying out for the first time a print job with a series of print elements for another pattern, the initial parameter adjustments of each one thereof are chosen in conformity with said average differences.

Consequently, the differences arising during the operation of the printing apparatus relative to the reference values are taken into account immediately upon starting the print run of a new pattern, as a result of which the ultimate optimum adjustment is attained considerably faster.

Since, when properly positioning an adjustment possibility controlling the printing process, it is customary to follow a predetermined sequence, i.e. the same sequence as followed for placing the screens into the rotary screen printing machine as viewed from the direction of printing, there is a possibility that, already before all adjustments controlling the same parameters for the various screen positions have been effected in a certain position, the end of the range of adjustment possibilities available in one direction will be reached.

The invention solves this problem by proceeding in a manner so that, when adjusting for the first time the registration relationship parameters of the print elements beginning with the first of each print element, the dimensional and directional difference, needed for optimum results, with respect to the reference value is observed, comparison is made with that for the next print element and the remaining adjustment margin thereof is ascertained, and, when for a parameter of a print element the limit of the adjustment margin in a particular direction is reached, the parameter adjustments of the preceding print elements are changed in opposite direction so as to increase the range of adjustment still remaining for the following print elements.

A problem frequently occurring in practice is that it may happen that adjustments have been going on on a machine in operation for some time already before it is noticed that it is impossible to set certain parameters at the proper value due to an error in, for instance, the placing of the screens or the fastening of the end rings or due to the wrong placing of the squeegee blade. This may result in a great loss in the printed product.

This drawback is eliminated according to the invention in that prior to starting a print run it is checked for each parameter recorded whether the latter can be set at the proper value and, failing this possibility, the starting of the printing process is blocked.

Preferably, each adjusting and control member is regularly checked as to its proper functioning.

When feeding parameter value data, a key board is preferably used having keys representing certain functions so as to prevent errors and illogical manipulations from occurring.

Furthermore, when setting a parameter value for various print elements, the value desired is always passed in the same direction and is subsequently returned to the final value desired, thus providing the advantage of eliminating play, if any, always in the same direction.

SUMMARY OF THE INVENTION

A method and apparatus for controlling printing equipment having a plurality of print elements, the operating parameters of each of which being adjustable by means of individual control devices, and each cooperating with sensors for recording the instantaneous values of these parameters and cooperating with an information carrier for recording therein the optimum parameter values as determined during the printing process of a particular pattern, the information carrier and the associated peripheral equipment being, according to the invention, of the type affording rapid erasure, replacement and read-out of information, while the adjusting units can be controlled directly by the read-out information.

Preferably, this apparatus is of such a design that during operation the sensors are capable of supplying continuously parameter value data and the peripheral equipment of the information carrier is adapted to alter, by external control while the printing apparatus is in operation, the parameter value data recorded on the information carrier in conformity with the parameter values taken by the sensors during operation. Thus, changes occurring during operation in the conditions and characteristics of the printing apparatus are taken into account and at all times optimum results are certain to be obtained already at the beginning of a print job.

In the known apparatuses, the reference values of the various operating parameters are always the basis for the first print run of a new pattern whose operating parameters are yet to be determined, which in many cases may lead to substantial waste of material. In order to remove this drawback, the apparatus of the invention is provided with comparator circuits for comparing the instantaneous parameter values, which are supplied by the sensors and correspond with optimum printing results, with the reference parameter values determined by the construction of the printing apparatus, circuits for determining the average of the respective differences and by using means adapted to record the parameter values altered in conformity therewith upon the information carrier, as adjustment instructions for the first printing of a new pattern.

These means ensure that, also for a first print run of a new pattern, the optimum parameter adjustments are attained with a minimum loss in time.

It is known that, in the case of printing apparatuses known per se, adjusting the registration relationship of the successive print elements, for instance screens, proceeds in a predetermined sequence, which may entail the danger that, if corrections are to be made continually in the same direction, it may indeed be possible for a first set of screens to be brought into a proper registration relationship with respect to each other but the remaining range of adjustment proves insufficient for the following screens. According to the invention this problem is eliminated by the use of first comparator circuits for comparing the instantaneous parameter values for each print element and for the registration-relationship parameters thereof with the reference value thereof determined by the construction of the printing apparatus, and for determining the difference therebetween in direction and dimension; second comparator circuits for comparing the differences observed for successive print elements with the margin of adjustment still remaining, and control circuits for controlling the parameter adjusting devices of the previously adjusted print elements, in such a manner that a correction opposite to the insufficient range of adjustment of the additional print elements is carried out.

In order to prevent one from attempting, when preparing a printing apparatus for operation, to obtain an optimum adjustment of the various print parameters, whereas in fact such is impossible because certain parts have been incorrectly mounted or disposed or because other defects occur rendering said objective unattainable, the invention provides for detecting means adapted to detect accordance between parameter values as set and values recorded on the information carrier, and circuits for blocking the printing apparatus in the event the attaining of accordance is impossible.

It is known that within and about a printing apparatus, which is provided with a large number of electric motors and electrically driven adjusting means, there occur considerable stray fields which may disturb the transmission of data from the sensors to the central control unit with the peripheral equipment. In order to eliminate this disadvantage, according to the invention, the sensors are of the type supplying analog signals and are each connected to the input terminal of a converter that converts the analog input signals into frequency-coded output signals which are transmitted to the peripheral equipment of the information carrier and which are therein converted into digital signals to be recorded on the information carrier.

Preferably, the information carrier is of the type whereupon information is, for example magnetically, recorded in binary form. To this end the information carrier may consist of a magnetizable tape.

The apparatus of the invention is preferably provided with means for the continuous digital indication of the instantaneous parameter values associated with a particular print element.

DESCRIPTION OF THE PREFERRED EMBODIMENT

Figure 1:
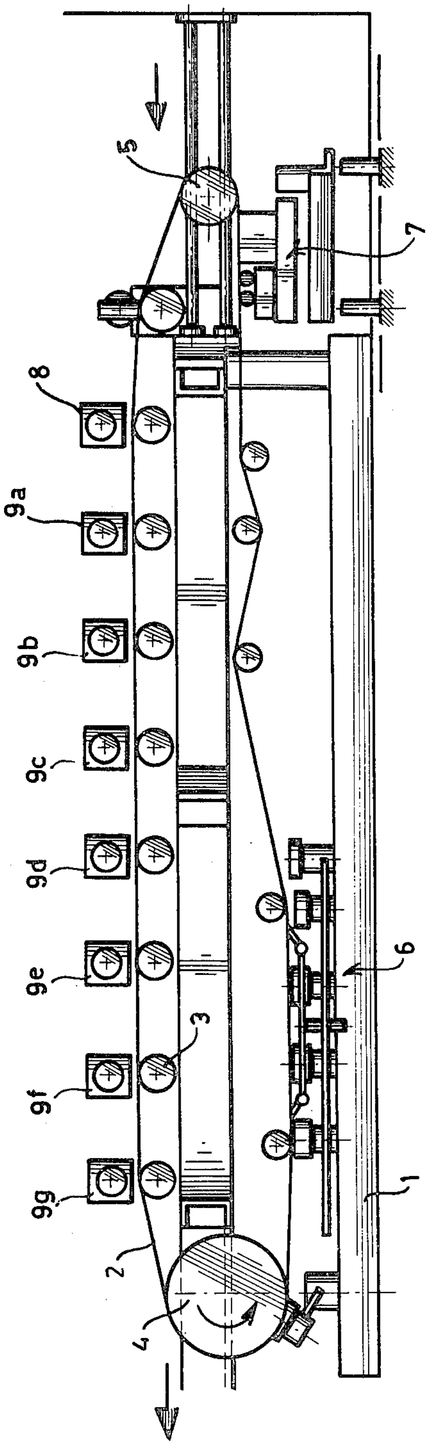
FIG. 1 is a diagrammatic side view of a printing apparatus wherein the method and apparatus according to the invention are used.

The printing apparatus shown in FIG. 1, in this case a rotary screen textile printing machine, comprises a frame 1 supporting an endless band 2 (i.e. the printing blanket) which is adapted to support and move the print-receiving material such as a web of textile. In the upper horizontal path of travel this band is supported on a plurality of support rollers 3 which are vertically movable in a manner not defined herein so as to raise and lower the upper part of the band, and said band is looped around the two end rollers 4 and 5. Along the lower part of the band 2 means 6 are provided for washing the band in a device 7 for applying a glue layer.

The frame 1 further provides mountings for a plurality of pairs of support members 8, each pair being adapted for providing support for the ends of a cylindrical screen 9 so that the screen 9 is rotatable on the supports. In FIG. 1 only the right hand support is designated, but in FIG. 2 two pairs of supports are shown, the upper support members being designated 8b—8b and the lower pair of support members being designated 8a—8a. It will be appreciated that the illustrations are diagrammatic since the construction of such supports is generally known.

Figure 2:
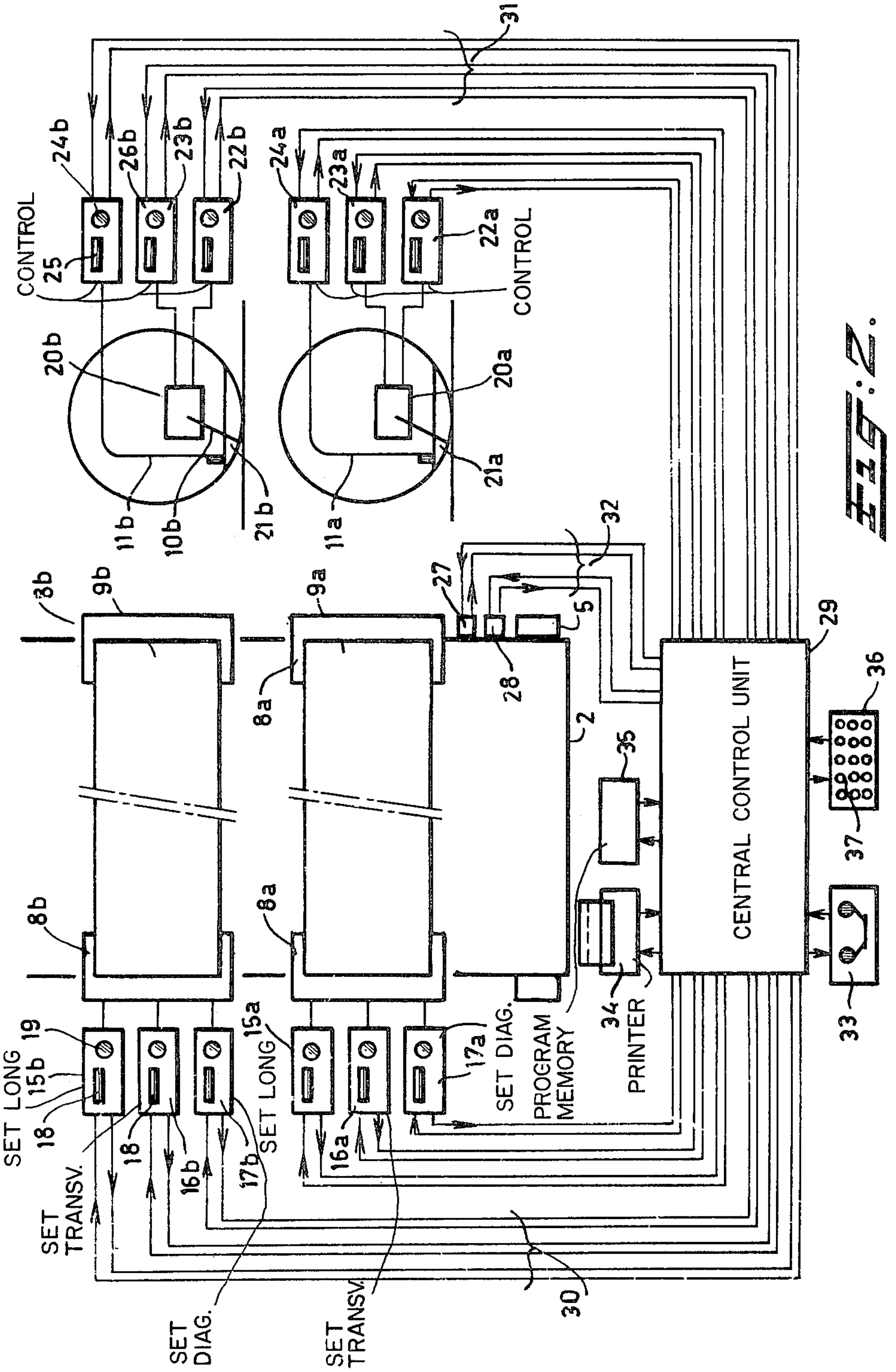
FIG. 2 is a diagrammatic representation, provided with block diagram, used further to explain the invention.

The cylindrical screens which are carried by and rotatable relative to the supports 8, 8a, 8b etc. are designated 9a–9g in FIG. 1 and two of these are shown at 9a and 9b in FIG. 2. Each screen cooperates with means, not shown, for rotatively driving the same. Furthermore each screen and its mounting is provided with adjusting mechanisms for accurately adjusting the position of at least one of the pair of support members supporting that screen.

The cylindrical screens 9a, 9b etc. are perforated according to the known techniques for printing upon a fabric web, the pattern of the perforation serving as a type of stencil through which a colorant in the form of a paste or paint is pressed by means of the squeegee arrangement to be described. Each screen results in a different image being laid down upon the web and normally of a different color. The particular apparatus which is illustrated uses eight screens; hence there will be eight different color images to be applied to the web. In the case of transparent inks which can be mixed to achieve composite images producing a wide range of colors, as for example in a printing press where the web is paper instead of fabric, the usual number of printing elements such as 9 will be four.

The web in this instance will pass in contact with the screens 9 and lie against the band or carrier belt 2 as it moves through the printing equipment.

Each pattern to be printed requires the use of a plurality of individual screens 9a . . . 9b, each of which affords the printing of a part of the total pattern on the material traveling along the path 2. As shown, all the screens must be accurately adjusted with respect to each other so as to ensure that each part of the pattern printed by a screen is placed in the proper location; this means that the longitudinal, transverse and diagonal adjustments are to be effected for each screen individually, while in addition for each screen not only the color of the paint used for the print job but also the pressure of the squeegee, the position of the squeegee and the paint level are to be adjusted separately so as to ensure that the correct amount of ink is applied in each print run. In addition, the glue layer on the printing blanket and the moisture of the printing blanket have to meet certain values.

According to the invention, the procedure is such that the various parameter values are recorded in digital form on a suitable carrier which cooperates with a central control logic, the data being read out for a particular pattern before starting a new print run and being used to adjust in accordance therewith the various parameter values, in which case the adjusting mechanisms are controlled directly by the read-out data, which leads to a considerable time saying in the process of adjusting the printing apparatus. In addition, a remarkable saving in material is obtained since adjusting the parameters in accordance with the readout data can be effected much more accurately than is possible when effecting adjustments manually in accordance with information read out of a carrier by the user.

A printing apparatus with auxiliary equipment in which this is put into effect is explained with reference to FIG. 2 which pertains to the control of the operating parameters of two screens only, i.e. screens 9a and 9b; it is clear that this control principle may be extended to the use of an arbitrary number of screens. As a matter of course FIG. 2 has been kept quite schematic and the various regulating and control members are not shown in greater detail; they are, however, part of the state of the art and the putting into practice of an arrangement as schematically shown in FIG. 2 will not cause any problems to those skilled in the art who are familiar with customary digital control and regulating equipment.

The servo equipment used to carry out the longitudinal adjustment is indicated, for the two screens 9a and 9b, by the reference numeral 15a, 15b, respectively, the one for the transverse adjustment being indicated by 16a, 16b respectively, and the one for the diagonal adjustment being indicated by 17a, 17b respectively. Each of these arrangements has a schematically indicated display 18, digital or analog, there also being the possibility of controlling the adjusting mechanism manually, as schematically indicated by the adjusting knob 19. The mechanism for adjusting the pressure of the squeegee and the position of the squeegee is indicated, for each screen, by the reference numeral 21a, 21b, respectively; the associated servo-control devices are indicated by the reference numerals 22a, 22b as regards the position of the squeegee, by 23*a,* 23*b* as regards the pressure of the squeegee, and by 24*a,* 24*b* as regards the paint level. Here too, each of these devices is provided with a display 25 for indicating the instantaneous value of the parameter to be set by means of the respective device, a possibility of manual adjustment, if needed, being schematically indicated by the operating knob 26.

The device for bringing the glue layer onto the conveyor belt 2 is indicated by the reference numeral 27, the one for washing the conveyor belt being indicated by the reference numeral 28. In this case as well, customary adjusting mechanisms and sensors not further defined are provided which afford effecting the adjustment and indicate the instantaneous value of the adjustment, respectively.

The servo-control devices receive control signals from the central control logic 29 and transmit parameter-value signals to said control logic 29. The central control logic 29, for example, may include the following:

| | Type |
|---|---|
| Microprocessor | Motorola M6800 |
| Software | 20K Byte EPROM, Motorola Mem 2716 |
| Memory | 2K Byte RAM |
| Disc Memory | 512K Byte, MPL Model 52 |
| Operating Console | Display TEE Max 1,218, and Keyboard RCA VP601 |
| Interface to Printing Machine | Opto-22 type OAC5 and Solid State Relays |

The above hardware and software example is one of many possible combinations to provide the central control logic 29. This is schematically shown by the groups of data transmission lines 30, 31 and 32, an arrow pointing in the direction of the control logic 29 indicating the transfer of information from the respective control and adjusting mechanism to the logic, and an arrow pointing away from said control logic indicating the transfer of control commands.

The control logic cooperates with a tape memory 33 which may be equipped with, for example, the tape cassettes as known on which, for each pattern, a pattern-characterizing code and the many operating parameters have been recorded. The logic may be provided with a printer 34 on which the information stored in the tape memory 33 can be printed out. There is furthermore the program memory 35 and an operating and signaling unit 36. The latter comprises a key board 37 enabling, by way of keys characterizing certain functions, the transmission of control commands to the central control unit 29. The use of such 'function-associated' keys prevents the occurrence of incorrect adjustments and illogical manipulations.

Figure 3:
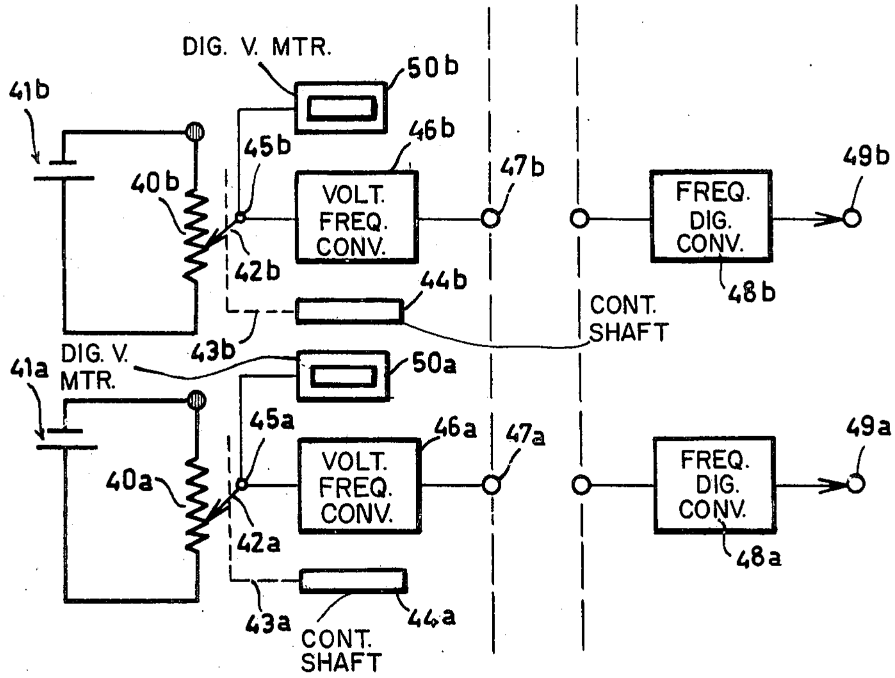
FIG. 3 is a block diagram of the converters used in accordance with the invention.

The parameter-value indicator devices are preferably of the form as schematically indicated in FIG. 3. The potentiometers used are of the type such as the potentiometer 40*a,* 40*b,* which are each connected to a suitable power source 41*a,* 41*b.* As schematically indicated by the broken line 43*a,* 43*b,* the respective slides 42*a,* 42*b* are coupled to an operating shaft 44*a,* 44*b* of an adjusting device. The position of this shaft is transmitted to the slide of the potentiometer and the voltage occuring on the terminal 45*a,* 45*b,* is a direct measurement of the position of the operating shaft 44*a,* 44*b* and thus of a parameter such as the longitudinal or transverse position of a screen. The voltage is supplied to a voltage-frequency converter 46*a,* 46*b* which on the output terminal 47*a,* 47*b* supplies an alternating voltage signal whose frequency is a measure for the respective operating parameters. It is these signals that are transmitted via the groups of lines 29, 30, 31. The aforedescribed conversion ensures that stray fields and interference voltages such as those frequently occurring in large installations having many electric motors, will have no influence. At the receiving end, i.e. in the central control unit 29 there have been provided converters 48*a,* 48*b* which convert the frequency signal received into a digital signal occurring on the terminals 49*a,* 49*b* and suitable for further digital processing.

The voltage on the terminals 45*a,* 45*b* of the slides of the potentiometers is supplied directly to a digital voltmeter 50*a,* 50*b,* and the value shown on the display characterizes the operating parameter.

Figure 4:
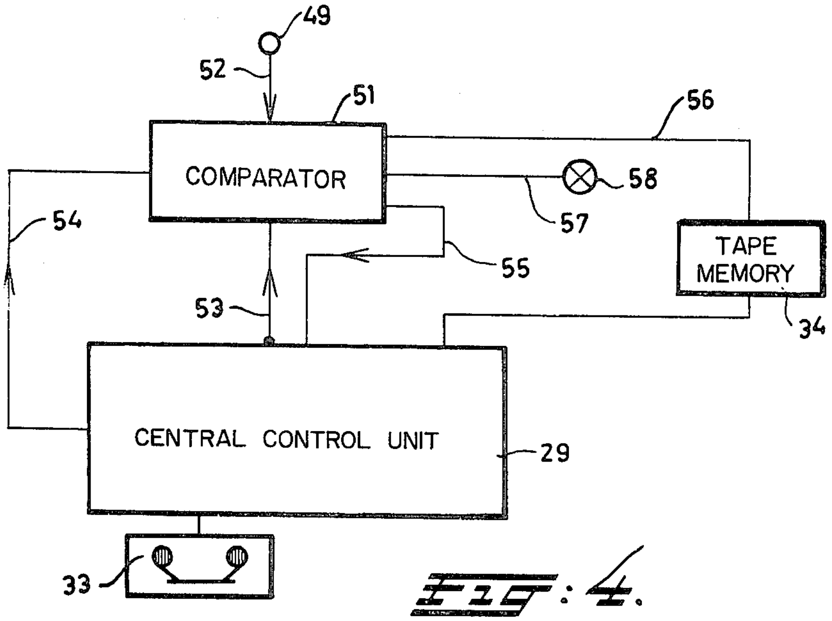
FIGS. 4 and 5 are block diagrams provided for the purpose of further explaining the invention.
Figure 5:
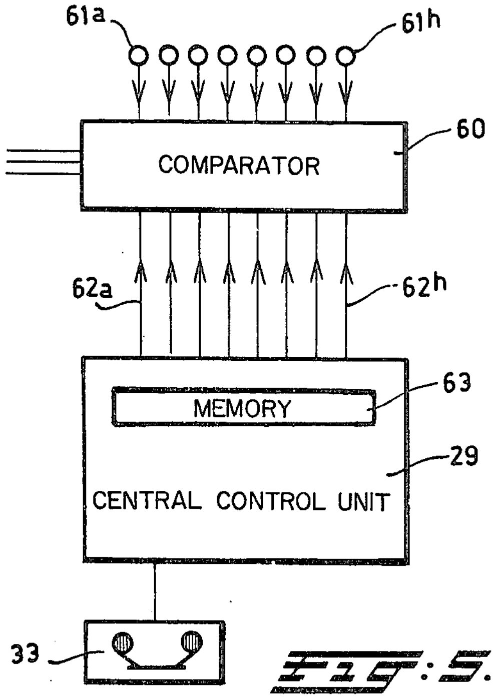

As shown in FIG. 4, there may be provided a plurality of comparators 51 which receive data from the outputs 49 of the converters 48. Via the line 53 they also receive from the central control unit 29 data on the value of parameters stored in the tape memory 33 and these data are compared with each other as controlled by a command supplied via the line 54. If there is a discrepancy, the new value is fed back to the central control unit via the line 55 and can be fed through said unit into the tape memory to replace the data present therein. These comparators 51 may also be used to verify the initial adjustment for the purpose of which both the instantaneous value of a parameter and the stored value are compared in the comparator 51 while, in the event of no accordance, there is not only supplied via the line 56 a blocking signal to the memory unit 33 but there is also the possibility of activating an alarm 58 via the line 57. The apparatus may also be provided with a comparator 60 (see FIG. 5) having a plurality of inputs 61*a* . . . 61*h,* to each of which a corresponding parameter value, for instance the longitudinal adjustment of a screen, of a number of screens 9*a* . . . 9*h* is fed along with, via the lines 62*a,* data on the value desired of the parameter (emanating from the tape memory) and data on the possible range of adjustment of this parameter which is determined by the construction of the printing apparatus and is stored in a separate memory 63 in the unit 28. This information is processed in the comparator 60, it being determined for each screen when the limit of a particular range of adjustment is reached by a parameter, in which case, as will be further described hereinafter, an opposite correction for the parameters previously set is carried out.

All the parameters in the best possible condition and as determined for the first print run of a new pattern are stored in the tape memory by means of the aforedescribed apparatus and, when repeating the pattern, are reproduced and used to obtain the same settings without the need for starting the printing process for this purpose. All the most desirable adjustments once obtained are measured and reproducibly recorded in digital form, this accumulation of digital data provided with a digitalized code indication, being used to automatically set all parameters desired when performing the reproduction. It is evident that enormous savings both in time and in material can be obtained in this manner.

Since in practice patterns are already frequently distinguished from one another by using code names and in order to prevent problems when introducing the system according to the invention, measured have been taken to the effect that any combinations of letters, numerals, and punctuation marks can be used to compose the code name. In order to keep the operation as simple as possible function-associated keys are used as a result of which illogical and erroneous manipulations are recognized and signaled automatically.

Since in every rotary screen printing machine there occur, when printing, inaccuracies caused by slight but necessary play in mechanical transmissions, dimensional variations due to tolerances, as well as elongations and other inaccuracies of the conveyor band mentioned hereinbefore adapted to support and move the material to be printed, said inaccuracies are ascertained during operation by detecting changes occurring in the optimum parameter setting by means of the comparator 51 and by automatically correcting data previously found and digitally stored using the average variation taken from the variations from the zero position which have since then occurred.

When the screens to be used in the rotary screen printing machine have been properly provided with a pattern, that is to say that the orientation of the pattern desired is identical on all screens and the end rings properly positioned with respect to each other are correctly in place and the screens have been put into the printing machine in a proper manner by means of the toothing on the end rings, then in principle the mechanical accuracy of all parts determines for each screen position the variation from the zero position in order to attain the ideal adjustment positions desired.

An average is derived from the accumulation of the necessary variations and is corrected for each new set of screens jointly representing a pattern and to be used on the screen printing machine.

It is clear that given a sufficient number of patterns said average will approach the machine-variations more and more accurately. The aforementioned averages of the various parameters are used automatically as adjustment values for a new pattern to be printed thus keeping waste of material as much down as possible when printing.

Since when properly positioning an adjustment possibility controlling the printing process it usually occurs that a certain sequence is followed which is the same as that in which, viewed from the direction of printing, the screens are placed into the rotary screen printing machine, there is the possibility that already before all the adjustments controlling the same parameter for the various screen positions have been carried out in a particular position the end of the adjustment possibilities available in one particular position will be reached. Such a condition is signaled by means of the comparator 60 whereupon on all the screen positions starting with the first, all other pertinent adjustments are effected in an opposite direction and to the same extent so as to obtain the correct adjustment for all positions. Although in this case there is question of adjusting the parameters for a new pattern for the first time there is obtained nevertheless a considerable saving because readjusting the parameters one by one proceeds much slower than the automatic simultaneous operation of adjusting according to the invention.

The construction of a good rotary screen printing machine is such that the range of adjustment is sufficient for all adjustment possibilities desired while including all inaccuracies in all screen positions which may be used on the machine in question. It nonetheless frequently happens in practice that while already carrying out adjustment operations on the printing machine in operation it is discovered after a few minutes that due to an error in placing the screens, fastening the ever present end rings on the screen or positioning a squeegee blade, it proves impossible to obtain the adjustment desired in all positions within the range of adjustment available as a result of which a great loss in the printed product may occur.

The comparator 51 signals an impossibility, if any, of reaching a particular positioning as desired and emits by means of the alarm 57 an alarm signal while indicating the position concerned. Without having started the printing process it is then possible to correct the error that has been made. In addition the operating device 34 can be blocked if so needed.

The automatic control functions of the servomotors herein mentioned being carried out by means of freely programable electronic circuits there is created a high degree of flexibility rendering it possible at all times to adapt the automatic control system to the number of rotational positions of the printing machine. The automatic control functions are carried out in a manner so that the difference between values measured and value adjusted is controlled with minimum deviation. In order to keep the influence of mechanical play in motors and transmissions down to a minimum it is ensured by means of an 'overshoot' that the value as adjusted is always approached in the same direction of movement.

All adjustment values are stored electronically in a 'non-volatile' memory. The sequence of storing is equal to the sequence of entry. Thus it is possible to retrieve all data and their age at any moment desired. When reaching the maximum memory capacity, the adjustment data of patterns not in demand may thus be removed to be replaced by new ones.

Variations are possible without departing from the spirit or scope of the invention as defined in the appended claims.

What it is desired to secure by Letters Patent of the U.S. is:

What is claimed is:

1. A method for controlling the operation of a printing apparatus in which a substrate is passed through the apparatus and is operated on by a series of consecutive printing elements, each of which is capable of adjustment in accordance with a plurality of parameters, a given printing run requiring that all parameters of the respective printing elements have certain values which result in proper composition and registration of the images produced by the printing elements upon the substrate as it passes through, said method comprising:

A. generating signals from the parameter values of all printing elements for a given printing run which is to be repeated in the future and whose format of parameters is acceptable for said printing run, B. converting said signals into first run digital data, C. recording and storing said digital data on a suitable recording medium in retrievable form, D. reading the recording medium and recalling said digital data each time a new printing run is made and before the run, and E. adjusting each of the printing elements in accordance with said recalled digital data, each recalled digital data signal being individual to a particular parameter of a particular printing element.

2. The method as claimed in claim 1 in which the parameter values of all of the printing elements are read during said new run to produce new respective digital data signals, and in which those of said new digital data signals which deviate from said first run digital data signals are recorded on said recording medium in place of the said first run digital data signals.

3. The method as claimed in claim 1 in which a reference value for each parameter of a printing element is chosen based upon the construction and placement of the printing element relative to the printing apparatus, the individual differences are measured and averaged, and when carrying out the printing of a print run for the first time with a different format other than the one during which the average was obtained, the initial parameter adjustments of each printing element is chosen in conformity with the respective average measurements.

4. The method as claimed in claim 1 in which the registration relationship parameters of the consecutive printing elements are initially adjusted by choosing a reference value, measuring the dimensional and directional differences relative to the reference value required for optimum results for the first printing element, making a comparison with the next following printing element and changing the parameters of said next following printing element to provide proper registration with the first printing element, and continuing with following printing elements, and readjusting the parameters of the already adjusted printing elements in an opposite direction when and if the limit of adjustment for any printing element in a given direction has been reached so as to increase the range of adjustments remaining for the following printing elements.

5. The method as claimed in claim 1 in which prior to starting said new printing run, the digital data corresponding to each parameter previously recorded is read out and compared with the available adjustment which is required to be made for that parameter during said new printing run and failing the ability of any adjustment to be physically made on the printing apparatus, blocking the start of the new printing run.

6. The method as claimed in claim 1 in which parameter adjustments are made on all printing elements in the same direction with a resetting in the opposite direction if required.

7. In a printing apparatus in which a substrate is passed through the apparatus and is printed upon by a series of consecutive printing elements, each of which is adjustable in accordance with a plurality of parameters, there being an individual control device arranged to adjust each respective parameter, the invention herein which comprises:

A. sensor means associated with said control devices and responsive to the condition of the respective control devices to provide a signal for each parameters, B. an information carrier coupled with said sensor means, capable of recording in data form signals for said parameters representing the optimum parameter values for a particular printing pattern, C. and means for reading out said data and driving said control devices automatically to adjust all of said parameters to correspond to those represented by said optimum data.

8. The invention as claimed in claim 7 in which the data on said information carrier are prerecorded.

9. The invention as claimed in claim 7 in which means are provided for continuously supplying parameter value data by said sensors to said information carrier and altering the data supplied to said information carrier during a printing operation to conform to the parameter values being measured by said sensors during operation.

10. The invention as claimed in claim 8 in which means are provided for continuously supplying parameter value data by said sensors to said information carrier and altering the data during a printing operation to conform to the parameter values being measured by said sensors during operation.

11. The invention as claimed in claim 7 which includes means for deriving reference parameter values related to the construction of said printing apparatus, comparator means for comparing the instantaneous parameter values determined by said sensors as representative of optimum printing results with said reference parameter values and deriving respective signals representative of the differences, means for determining the average of the respective differences and means for recording on said information recorder data representing the parameter values altered in accordance with said respective averages as adjustment instructions for the first printing of a new pattern.

12. The invention as claimed in claim 7 in which first comparison means are provided for comparing the instantaneous parameter values for each printing element and for the registration relationship parameters thereof with the reference value thereof as determined by the construction of the apparatus and for determining the difference therebetween in direction and dimensions, second comparison means are provided for comparing the respective differences for successive printing elements with the range of adjustment still remaining, and means for driving said control devices to provide a parameter correction opposite to the insufficient range of adjustment to the previously adjusted printing elements to enable further adjustment of the following printing elements.

13. The invention as claimed in claim 8 in which means are provided to detect the adjustment of parameters in accordance with the prerecorded data on said information carrier and to block operation of said printing apparatus if said adjustments as called for by said prerecorded data are impossible to attain.

14. The invention as claimed in claim 7 in which the information carrier is remote from said printing apparatus, said parameter signals provided by said sensors are analog in character, means are provided for frequency coding said analog signals and transmitting same to said information carrier and means are provided for converting said frequency coded signals into digital signals whereby the signals recorded on said information carrier are in digital form.

15. The invention as claimed in claim 7 in which the signals recorded on said information carrier are in binary form.

16. The invention as claimed in claim 13 in which the signals recorded on said information carrier are recorded magnetically.

17. The information as claimed in claim 7 in which means are provided for the continuous digital indication of the instantaneous parameter values associated with any particular printing element.

18. The invention as claimed in claim 7 in which the printing apparatus is a rotary screen printing machine having a printing blanket adapted to carry water and glue, squeegees, the printing elements comprise rotary cylindrical perforated sreens arranged to have paint therein and said drive means provide for the setting of the screens in multiple positions including longitudinal, transverse and inclined, said drive means include means for effecting the position and physical conditions of each squeegee, for adjusting the paint level in the respective screens and for adjusting glue and water film thickness on a printing blanket.

* * * * *